United States Patent [19]

Eldridge et al.

[11] Patent Number: 4,742,731

[45] Date of Patent: May 10, 1988

[54] TRANSMISSION RANGE SELECTOR VALVE

[75] Inventors: Joseph L. Eldridge, Libertyville, Ill.; Terrance P. Lynch, Sanford, N.C.

[73] Assignee: Payhauler Corp., Batavia, Ill.

[21] Appl. No.: 943,026

[22] Filed: Dec. 18, 1986

[51] Int. Cl.$^4$ .................. B60K 20/10; B60K 20/12; B60K 20/14

[52] U.S. Cl. ..................... 74/745; 74/335; 192/3.57; 192/109 F

[58] Field of Search ............... 74/335, 745; 192/3.57, 192/109 F

[56] References Cited

U.S. PATENT DOCUMENTS

| | | | |
|---|---|---|---|
| 3,137,311 | 6/1964 | Rohweder et al. | 192/3.57 |
| 3,171,300 | 3/1965 | Perkins et al. | 74/745 |
| 3,274,858 | 9/1966 | Meyer et al. | 192/87.19 X |
| 3,468,194 | 9/1969 | Horsch et al. | 192/109 F X |
| 3,709,065 | 1/1973 | Starling | 192/109 F X |
| 3,719,102 | 3/1973 | Leber et al. | 192/3.57 X |
| 3,762,518 | 10/1973 | Hilpert | 192/3.57 X |
| 3,799,308 | 3/1974 | Erisman | 192/3.57 |
| 3,882,980 | 5/1975 | Blake | 192/3.57 |
| 3,941,007 | 3/1976 | Webber et al. | 192/3.57 X |
| 3,944,035 | 3/1976 | McRay | 74/745 X |
| 3,945,265 | 3/1976 | Bell et al. | 74/335 |
| 3,990,553 | 11/1976 | Holzinger et al. | 192/3.57 |
| 4,046,160 | 9/1977 | Horsch | 192/3.57 X |
| 4,135,610 | 1/1979 | Chatterjea | 192/3.57 X |
| 4,138,004 | 2/1979 | Horsch | 192/3.57 |

Primary Examiner—Dirk Wright
Attorney, Agent, or Firm—McDermott, Will & Emery

[57] ABSTRACT

A transmission includes a range selector valve that eliminates the possibility of unintentional simultaneous multiple gear engagement by a fail safe arrangement of fluid flow paths and valving. A pair of parallel paths connect to clutches that operate a high-low power shift transmission and a multiple speed power shift main transmission. The fluid flow path to the multiple speed power shift main transmission clutches is valved to select either a first or second group of speed/direction settings. Each of these groups then includes at least one valve to select a particular transmission speed or direction setting.

10 Claims, 1 Drawing Sheet

TRANSMISSION RANGE SELECTOR VALVE

BACKGROUND OF THE INVENTION

1. Field of the Invention

This invention relates generally to transmissions and particularly to a range selector valve for heavy duty transmissions.

2. Brief Description of the Background Art

Conventional, commercially available range selector valves for use in transmissions of heavy equipment are susceptible to the possibility that more than one gear will be engaged at any one time due to a hydraulic or electrical malfunction. For example, an inappropriate combination of solenoids may be electrically energized as a result of an electrical malfunction.

In the range selector valve now marketed by Twin Disc Inc., of Racine, Wis., a latch plate is used to provide a fail in gear feature. The Twin Disc arrangement, as implemented, for example, on their TD-61-2607 transmission, uses a plurality of essentially parallel valves to select the transmission splitter and range settings. With this arrangement an accidental actuation could cause multiple settings to be achieved, resulting in severe consequences.

The commercially available Detroit Diesel Allison 5000, 6000 series transmissions employ a cascade oil flow circuit to eliminate the possibility of accidental multiple gear engagements. When valve A is activated, the oil flow is diverted to the clutch A. Since all of the flow is diverted, no clutch down stream can be pressurized. If a clutch upstream from the clutch A is pressurized, all flow will be diverted to that clutch and clutch A will be deactivated.

A number of selector valves are shown in the prior art. Representative of these efforts are U.S. Pat. Nos. 4,135,610, 4,046,160, 3,990,553, 3,944,035, 3,941,007, 3,762,518, 3,468,194, and 3,274,858.

It would be highly desirable to provide a transmission with a range selector valve that eliminates the possibility of simultaneous multiple gear engagements. Moreover, it would be highly desirable to provide such an arrangement that is simpler in design than those previously known.

SUMMARY OF THE INVENTION

It is a primary object of the present invention to provide a transmission with a range selector valve that eliminates the possibility of simultaneous multiple gear engagements.

It is still another object of the present invention to provide such a system that is accomplished with a valve that is simpler in design than valves used in the past.

It is still another object of the present invention to provide such a valve in which the fail in gear feature is inherent without having to use a latch plate.

These and other objects of the present invention may be achieved by a transmission with a range selector valve that eliminates the possibility of unintentional, simultaneous, multiple gear engagements. The valve is operatively connectable to a high-low power shift transmission having high and low settings and a multiple speed power shift main transmission having a plurality of speed/direction settings. Both of these transmissions may be housed within a common case. The valve includes a means for selecting either the high or the low setting of the high-low power shift range transmission. Means are also provided for selecting either a first or second group of at least two speed/direction settings of the main transmission. Means also select a desired speed/direction setting from the selected group of main transmission speed/direction settings.

DETAILED DESCRIPTION OF THE PREFERRED EMBODIMENT

Figure 1:
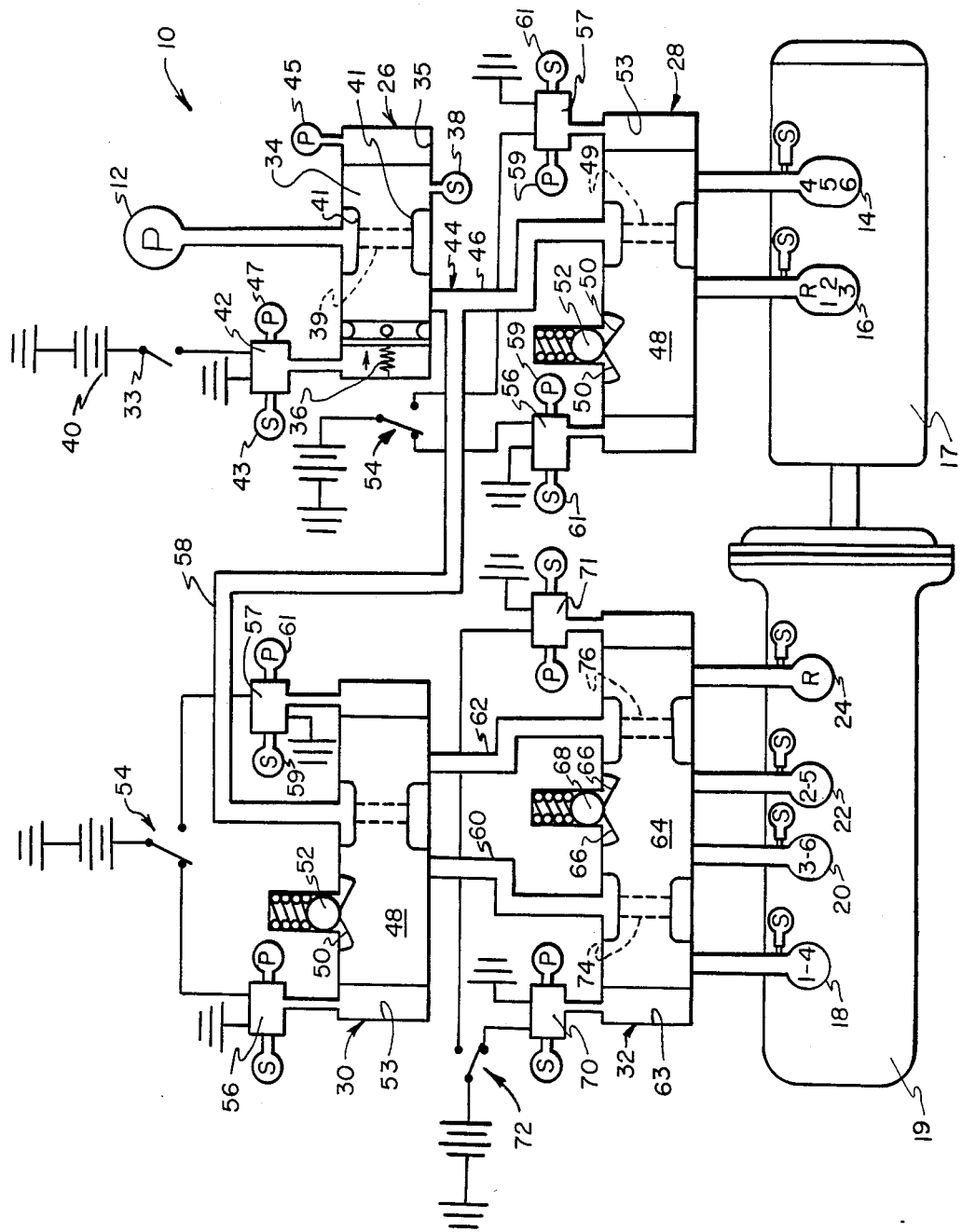
FIG. 1 is a schematic view of one embodiment of a transmission in accordance with the present invention.

Referring to the drawing wherein like reference characters are used for like parts throughout, a transmission range selector valve 10 is connected to a source of hydraulic fluid such as a pump 12. The valve 10 is operable to select the appropriate clutch port 14 or 16 of a high-low power shift range transmission 17 and the appropriate speed or direction clutch ports 18 through 24 of a multiple speed power shift main transmission 19. While in the illustrated embodiment the multiple speed power shift main transmission 19 has only three range settings (high, intermediate and low) and a reverse setting, transmissions that utilize more or less settings may be implemented with the present invention as well.

In the illustrated embodiment, the valve 10 is implemented by a neutral selector valve 26, a pair of two (2) position, three way selector valves 28 and 30 and one dual selector valve 32. These valves are pilot operated and solenoid controlled.

The control of the neutral selector valve 26 is similar to the scheme used by Twin Disc to control their before mentioned latch plate.

The purpose of the neutral selector valve is twofold. Its first purpose is to achieve neutral when the operator desires. The second purpose is to provide a fail-in-gear feature so that if electrical power is lost, the transmission will remain in the gear that it was in at the time of the loss of electrical power rather than reverting to neutral. These purposes are accomplished as described in the following paragraphs.

Three major forces can act on the neutral selector valve spool 34. These are the hydraulic pressure force acting on the right end of the spool, the hydraulic pressure force acting on the left end of the spool and the force due to spring 36.

Normally, solenoid 42 is de-energized and the pressure to the left end of spool 34 is blocked. In this case, the spring force is overcome by the hydraulic pressure force acting on the right end of spool 34 and the spool is forced to the left. Now oil pressure from pressure source 12 is in communication with the oil passages to the rest of the system 44. The same situation results if a loss of electrical power occurs. If the operator wants to put the transmission in neutral, switch 33 is closed, solenoid valve 42 opens so that hydraulic pressure from pressure source 47 acts on the left end of spool 34. This force, in addition to the force from spring 36, overcomes the hydraulic pressure acting on the right end of the spool. Spool 34 is forced to the right. Now the pressure from pressure source 12 is relieved directly to sump 38. Any residual pressure in the rest of the system is also relieved to sump because main line 44 is in communication with sump 38 through the annuli and drilled passages 39 in spool 34.

When the entire machine is shut down, all hydraulic pressure is lost. The only force acting on the spool 34 is the force from spring 36. The spool is then forced to the right and the transmission reverts to neutral as described above.

The valve 28, connected to the valve 26 by the leg 46 of the fluid path 44, includes a spool 48 which has two preferred positions determined by the detents 50 in the spool 48, each of which may be engaged by the spring biased ball 52 mounted in the valve wall 53. The spool 48, having an annulus 49, is biased to either its left or rightmost position according to the setting of the electrical switch 54 connecting to one or the other of the solenoid valves 56 or 57 each selectively connectable to a pump 59 or sump 61. The selected valve 56 or 57 moves the spool 48 so that communication is established with one of the clutch ports 14 or 16 to select a high or low range on the splitter or high-low power shift range transmission 17. For example, in the illustrated embodiment, the clutch port 14 connects to the "high" clutch which is responsible for ranges 4 through 6 while the clutch port 16 connects to the "low" clutch which is responsible for speed ranges 1 through 3 and direction range, "reverse."

The other leg 58 of the flow path 44 connects to the second two position, three-way selector valve 30. The selector valve 30 is generally identical to the valve 28 and includes a spool 48, ball 52, detents 50, housing 53, and a pair of solenoid valves 56 and 57 which are selected by a switch 54 as described previously. However, when the spool 48 of the valve 30 is in its leftmost position, the leg 58 of the flow path 44 is connected to the flow path 60 while when the spool 48 is in its rightmost position, the fluid is connected to the flow path 62.

The flow paths 60 and 62 are connected to the dual selector valve 32. The valve 32 includes a spool 64 with a pair of centrally located detents 66 which engage a spring biased ball 68 to define the two position settings of the spool 64 within the valve housing 63. The solenoid valves 70 and 71 are electrically connected to a switch 72 to determine the position of the spool 64. When the leftmost flow path 60 is selected, fluid flow may be directed by the annulus 74 to low or high range group of clutch ports 18 or 20. On the other hand, when the rightmost flow path 62 is selected, fluid flow may be diverted by the annulus 76 to either the intermediate or reverse group of clutch ports 22 and 24.

The transmission range selector valve 10 operates within a transmission in the following manner. When the transmission is engaged, the solenoid valve 42 is not engaged and fluid flow is diverted from the pump 12 to the fluid flow path 44. Fluid pressure along the leg 46 is diverted to the desired clutch port 14 or 16 to select a high or low setting of a high-low power shift transmission 17 using the two-position three-way selector valve 28.

The selection of the desired power shift main transmission speed/direction setting is such that it is impossible for there to be simultaneous multiple gear engagement. This is because the valve 30 is responsible for exclusively selecting either a first group of transmission speed/direction settings, in the illustrated embodiment, the settings corresponding to the clutch ports 18 and 20, or a second group of settings corresponding to the clutch ports 22 and 24. Once this exclusive decision is made, only one of the settings within a given group can be chosen by the dual selector valve 32, due to its configuration. Even in case of a total electrical malfunction it would be impossible for more than one setting to be selected on the multiple speed power shift main transmission 19.

While the present invention has been described with respect to a single preferred embodiment, those skilled in the art will appreciate a number of modifications. Clearly, more or fewer transmission speeds can be controlled using the concepts of the present invention. The dual selector valve 32 could be replaced by two electrically or mechanically linked two-position, three-way selector valves. The illustrated embodiment could be adapted to an eight-speed transmission. Similarly the neutral selector valve 26 could be replaced by a dual selector valve if one branch of the circuit 44 requires different flow rates than the other branch. The valve spool detents could possibly be eliminated. Thus the appended claims are intended to cover all modifications and variations as come within the true spirit and scope of the present invention.

What is claimed is:

1. A transmission having a range selector valve that eliminates the possibility of unintentional, simultaneous, multiple gear engagements, said valve operatively connectable to a high-low power shift transmission having high and low settings and a multiple speed power shift main transmission having a plurality of speed/direction settings, said valve comprising:
   means for selecting either the high or the low setting of said high-low power shift range transmission;
   means for selecting either a first or second group of speed/direction settings of said main transmission, at least one of said groups having at least two speed/direction settings; and
   means for selecting a desired speed/direction setting from the selected group of main transmission speed/direction settings.

2. The transmission of claim 1 wherein said means for selecting a desired speed/direction setting from the selected group is a dual selector valve.

3. The transmission of claim 1 wherein said means for selecting either a first or second group of at least two speed/direction settings of said main transmission is a two-position, three-way selector valve.

4. The transmission of claim 1 wherein said means for selecting either a first or second group is exclusive such that if one group is selected another group cannot be simultaneously selected.

5. The transmission of claim 4 wherein said means for selecting a desired speed/direction setting is exclusive such that once a setting is selected no other setting in the group can be simultaneously selected.

6. The transmission of claim 1 including a neutral selector valve.

7. A range selector valve that eliminates the possibility of unintentional, simultaneous, multiple gear engagements, said valve operatively connectable to a high-low power shift transmission having high and low settings and a multiple speed power shift main transmission having a plurality of speed/direction settings, said valve comprising:
   a housing connectable to a source of hydraulic fluid;
   first valve means, in fluid communication with said source, for selecting either the high or low setting of said high-low power shift range transmission;
   second valve means, in fluid communication with said source, for selecting either a first or second group of two speed/direction settings of said main transmission, at least one of said groups including at least two speed/direction settings;
   third valve means, in fluid communication with said second valve means, for selecting a desired speed/- direction setting from settings within the group selected by said second valve means; and a pair of fluid flow channels in said housing, connecting said second valve means to said third valve means, each of said channels corresponding to a different one of said groups.

8. The valve of claim 7 wherein said third valve means includes a dual selector valve.

9. The valve of claim 7 wherein said first and second valve means each includes a two-position, threeway selector valve.

10. The valve of claim 7 wherein said second and third valve means are exclusive such that once a selection is made no other selection can be made simultaneously.

* * * * *